July 24, 1962

F. W. ROSS 3,045,894

GAS TURBINE ENGINE

Filed May 22, 1957

INVENTOR.
Frederick W. Ross
BY Barthel + Bugbee
Attys

July 24, 1962 F. W. ROSS 3,045,894
GAS TURBINE ENGINE
Filed May 22, 1957 6 Sheets-Sheet 4

INVENTOR.
Frederick W. Ross
BY Barthel + Bugbee
Attys 3,045,894
GAS TURBINE ENGINE
Frederick W. Ross, 719 N. Melborn Ave.,
Dearborn, Mich.
Filed May 22, 1957, Ser. No. 660,912
3 Claims. (Cl. 230—114)

This invention relates to gas turbine engines and, in particular, to means for controlling the power delivered by such engines.

Hitherto, the power delivered from the output shaft of a conventional gas turbine engine consisting of an air compressor and a turbine driven by the combustion gases from the combustion chamber supplied with air from the compressor has been controlled by varying the rate of fuel flow and the rotational speed of the compressor or by varying the combustion gas temperature through control of the rate of fuel flow at constant rotational speed of the compressor or in combinations thereof. In particular, in one such turbine engine, the rate of fuel injected into the combustion chamber has been reduced in order to reduce the power output of the turbine. This reduces the rotational speed of the compressor rotor and hence the mass flow of air through the compressor. By mass flow is meant the weight of air or consequently the number of molecules of air flowing per second which in physics units is designated in pounds per second and in engineering units in slugs per second. In another type of conventional gas turbine engine, the power in controlled by varying the temperature of the combustion gases by controlling the rate of fuel flow without varying the speed.

In such prior gas turbine engines, when operated at or near full power, the fuel consumption is comparable to equivalent sized piston engines. However, the fuel consumption at part power (such as, for example, at 20% of full power) is almost as great as at full power because of the fact that at part power the compression ratio drops rapidly as the compressor slows down, causing the efficiency also to decline greatly. In particular, where a compression ratio of 4.0 is obtained at full power and drops to 1.5 at part power, the consequent slowing down of the speed of the compressor could cause the engine efficiency to decline to approximately as much as 25% of its full-power efficiency. By compression ratio in a gas turbine engine is meant the ratio of the compressor outlet pressure to the compressor inlet pressure. Both of these pressures can be measured by manometers or other known pressure-indicating devices.

Conventional gas turbine engines have been more successfully applied to trucks and similar commercial transport vehicles than to passenger vehicles, because for a larger percentage of the operational time, the turbine and consequently the compressor of the gas turbine engine can be operated at or near the maximum power output condition where the compressor ratio and the efficiency are comparatively high. Gas turbine engines, however, have not yet been successfully applied to passenger automobiles on a commercial scale because such vehicles are usually comparatively over-powered. Consequently, a large percentage of the time, passenger automobiles are operated at no more than twenty-to-forty percent of their full power. As a consequence, in gas turbine engines applied to passenger automobiles, acceleration has been very sluggish during the period when the compressor is being brought up to its normal operating speed and efficiency. Consequently fuel consumption has been excessively high and fuel economy correspondingly unsatisfactory because of the variation in compressor speed. The gas turbine engine, however, should be almost ideally suited to the propulsion of passenger vehicles because of the compact size of a powerful engine as compared with the much larger bulk of a conventional piston engine of the same power.

Heretofore, however, in gas turbine engines, for reduction from full power operation to part power operation, three different expedients have been adopted: First, by reducing the speed of rotation of the compressor; second, by reducing the temperature of the hot gases which drive the turbine by reducing the fuel feed rate to the combustion chamber; and third, by a combination of both of the foregoing expedients.

In the first expedient, the mass air flow is controlled and with it the weight of air delivered to the combustion chamber by reducing the speed of rotation of the compressor, the rate of fuel flow to the combustion chamber being simultaneously adjusted in order to maintain a substantially constant temperature at the turbine blades. In the second expedient, the rate at which the fuel is injected is reduced while the speed of rotation is kept constant, in order to reduce the temperature of the combustion gases. At lower part power settings, however, in order to keep the rotational speed of the compressor constant, the compressor delivers excessive air to the combustion chamber and the fuel feed rate at full power has to be reduced to maintain it.

This expedient works satisfactorily over a limited range only, as the practical working limits are soon reached. Accordingly, at full power, a higher compression ratio is sacrificed in order to obtain the necessary rate of mass flow of air whereas at a lower power setting, the speed of rotation is lowered to obtain a lower rate of mass flow as needed. Accordingly, at part power operation of such prior gas turbine engines, the specific fuel consumption, namely the pounds of fuel expended per horse power per hour, is higher because of the lower compression ratio existing at part power operation.

The present invention makes it possible to operate a gas turbine engine at part power operation with a reduced rate of mass flow of air yet with the compression ratio maintained at its peak value as at full power operation, with resulting economy of fuel consumption. Moreover, by the present invention, the combustion gas temperature can be adjusted to the lowest usable temperature, and the above advantages can be obtained over the complete power operating range of the engine, thereby maintaining the specific fuel consumption at a minimum over the range from full power operation through part power operation.

Moreover, the gas turbine engine of the present invention eliminates or greatly reduces the above-mentioned defects of the conventional gas turbine engine by operating the compressor at a relatively constant speed and varying the power output and consequently varying the speed of the vehicle by varying the mass flow of air through the compressor yet maintaining the compression ratio at a more nearly constant high figure than in a conventional gas turbine engine and consequently maintaining a high efficiency of operation together with a high fuel economy. The compression ratio is maintained at a high figure in part by setting up a back pressure from the compressor-driving turbine.

The present inventor in the present specification and drawings, has disclosed several different means for varying the mass flow through the compressor while maintaining it at a substantially constant speed of rotation and has also disclosed means for varying the mass flow of combustion gases through the power output turbine or turbines. The different mechanisms provided according to the present invention include a divided compressor having relatively movable parts (FIGURES 1, 7, 14 and 22) enabling variation of the cross-sectional area of the air stream through the compressor; a multiple longitudinal channel compressor (FIGURE 15) having means for covering and uncovering the channels successively; variably masking or shrouding the vanes or blades of an axial flow compressor (FIGURE 16); providing dual compressor rotors (FIGURE 17) or tandem compressor rotors (FIGURE 18), the inlets of which are adapted to be individually closed in sequence; multiple radial channel flow compressor with selective valving of individual channels (FIGURES 19 and 21); a radial flow output turbine having multiple longitudinal channels which are selectively valved (FIGURE 23); and a compressor drive turbine directly coupled to the output shaft (FIGURE 26) which in turn drives, at a substantially constant speed, an electric generator, fan or other substantially constant speed machine.

Accordingly, one object of the invention is to provide a gas turbine engine having means associated therewith for varying the mass flow of air through the compressor while maintaining the compression ratio and the speed of the compressor rotor substantially constant while varying the power of the output turbine by varying the quantity of fuel delivered to the combustion chamber of the engine.

Another object is to provide a gas turbine engine of the foregoing character wherein the mass flow of air through the compressor is varied by varying the cross-sectional area of the air stream through the compressor.

Another object is to provide a gas turbine engine, as set forth in the object immediately preceding, wherein speed-responsive means, such as a governor, is provided for automatically varying the cross-sectional area of the air stream through the compressor in response to variation in the speed of the compressor-driving turbine.

Another object is to provide a gas turbine engine of the foregoing character wherein the variation of the cross-sectional area of the air stream through the compressor and consequently the variation in the mass flow of air through the compressor is applied to axial flow compressors as well as to radial flow compressors.

Another object is to provide a gas turbine engine of the foregoing character wherein the combustion in the combustion chamber is enhanced by the provision of an improved combustor giving more efficient burning of the fuel in the air stream emerging from the compressor.

Another object is to provide a gas turbine engine of the foregoing character wherein the variation in the mass flow through an axial flow compressor or turbine is effected by masking or shrouding the vanes or blades thereof.

Another object is to provide a gas turbine engine of the foregoing character wherein the multiple channels of the rotor of a compressor or output turbine are selectively or sequentially valved in order to vary the mass flow of gas therethrough.

Other objects and advantages of this invention will become apparent from the following description of the accompanying drawings, wherein.

In the foregoing drawings, the showing of the various forms of the invention is somewhat diagrammatic for purposes of clarity and simplification, certain parts being shown integral with one another whereas in actual practice such parts would be separately constructed and united by suitable fasteners.

Referring to the drawings in detail, FIGURES 1 to 6 inclusive show a gas turbine engine, generally designated 30, according to one form of the invention as housed in a casing or housing structure, generally designated 32, and consisting generally of an adjustable radial flow compressor unit 34 discharging into a combustion unit 36 which in turn discharges into a turbine unit 38 and thence into the atmosphere. The housing structure 32 (FIGURE 1) includes a compressor casing 40 having an annular outer or peripheral portion 41 containing an annular plenum chamber 42 connected to circumferentially-spaced approximately axial tubular combustion ducts 43 containing elongated centrally-enlarged combustion chambers 44, and connected at their rearward ends 49 to an annular turbine casing 45. The combustion ducts 43 centrally support a central bearing 47 which in turn rotatably supports the central portion of a main rotary shaft 46. The latter is also supported by a bearing 48 in the inner radial wall 50 of the compressor casing 40 and by a bearing 52 mounted in a radial web 53 disposed adjacent the turbine unit 38 at the outlets of the combustion chambers 44. The annular peripheral compressor wall 41 and the radial wall 50 thereof are marginally flanged where they are bolted or otherwise secured to the correspondingly-flanged intake ends 54 of the combustion ducts 43 containing the intake ports 56 thereof. The outer or left-hand end of the compressor shaft 46 is additionally supported rotationally by an outboard bearing 58 carried by a spider 60, the outer ends of which are secured to the peripheral compressor casing portion 41.

The spider 60 is provided with an inwardly-projecting bracket arm 62 (FIGURE 1) the free end of which pivotally supports a pivot pin 64 of a yoked compressor hub shifting lever 66, the lower arms of which carry inwardly-projecting shift pins 70 facing diametrically toward one another on an axis intersecting the axis of rotation of the compressor shaft 46 and engaging the annular groove 72 of a shaft collar 74 intergral with the hub 76 of the movable half 80 of a radial flow compressor rotor, generally designated 82, having a stationary half 84 associated therewith. The stationary compressor rotor half 84, as its name signifies, is stationarily keyed or otherwise operatively connected as at 86 to the left-hand portion of the compressor shaft 46, whereas the hub 76 of the movable compressor rotor half 80 is keyed, splined or otherwise reciprocably yet operatively connected as at 88 to the left-hand end portion of the compressor shaft 46 so as to be reciprocable therealong in response to the swinging of the shift lever 68 while being operatively connected thereto. Pivotally connected at 90 to the lower end of the yoke shift lever 66 is an operating rod 92 which is connected to a suitable hand lever (not shown) or other means of control by the operator. A compression spring 93 of sufficient force to counteract the pressure pushing apart of the rotor halves 80 and 84 is connected between the lever 66 and the lug 95 on the spider 60.

Pivotally connected as at 94 to the upwardly-projecting upper arm 96 of the yoked lever 66 (FIGURE 1) is one end of a link 98, the opposite end of which is pivotally connected at 100 to the operating arm 102 of a liquid fuel control valve 104. The valve 104 is disposed between the liquid fuel intake pipe 106 and the liquid fuel discharge pipe 108 for regulating flow of liquid fuel, such as diesel oil, kerosene or other hydro-carbon liquid fuel from the pipe 106 to the pipe 108, from whence the liquid fuel flows into an annular manifold or distribution pipe 110. Extending inward from the manifold 110 at circumferentially-spaced locations therearound (FIGURES 1 and 4) into the combustion chambers 44 are approximately radial fuel supply pipes 112 terminating in approximately axial spray nozzles 114.

The spray nozzles 114 discharge into the bell-mouthed or flared entrances or inlets 116 of elongated venturi-shaped combustion tubes 118 of combustors, generally designated 120. Each combustor tube 118 has an outwardly-flared discharge portion 121 connected to the inlets 116 at constricted portions 122. Each combustion tube 118 is mounted on struts 126 preferably of air foil cross-section and extending diametrically across the combustion chambers 44 within the combustion ducts 43. Secured by radial struts 117 in radially-spaced relationship to the rearward or outlet end of each combustor tube 118 is a hollow cylindrical flame shield or sleeve 128 which directs the flame of combustion into the central part of its respective combustion chamber 44. Mounted in each sleeve 128 is a conventional igniter 124, such as a spark plug. The sleeve 128 protects the flame from being blown out by the blast of air passing around the combustors 120. Other types of combustors, such as that shown at 518 in FIGURE 16, may obviously be substituted for the combustors 120 in any of the various forms of gas turbine engines disclosed herein.

The movable and stationary halves 80 and 84 respectively of the compressor rotor 82 are provided with outwardly-curving circumferentially-spaced vanes or blades 130 and 132 respectively (FIGURES 2 and 3) which closely overlap one another so as to minimize leakage therebetween while enabling changing the cross-sectional area of the arcuate diverging radial blade channels 134 therebetween, so as to change the mass flow of air therethrough. The channels 134 at their outer ends are provided with approximately radial outlet ports 138 discharging into the annular plenum chamber 42 preceding the combustion chambers 44. In order to inhibit air leakage between the outer compressor portion 41 and the movable compressor rotor half 80, the end wall 142 thereof is provided with an annular outer rim 144 of U-shaped cross-section interfitting with a corresponding annular rim 146 of oppositely-facing U-shaped cross-section.

The rearward ends of the combustion ducts 43 adjacent their junction with the turbine casing 45 are provided with discharge ports 148 opening into the annular turbine blade chamber 150 of the turbine unit 38. Reinforcing struts 152 are disposed within the forward end of the turbine casing 45 and extend diametrically across the annular chamber 150 thereof, immediately outward of the web 53 which supports the rearward main shaft bearing 52.

Keyed or othrewise operatively connected to the rearward end of the rotary main shaft 46 is the hub of a compressor-driving turbine rotor 154 having peripheral blades or vanes 156 of air foil cross-section (FIGURE 6) and inclined relatively to the axis of the shaft 46. The blades 156 are disposed within the annular turbine chamber 150 within the narrowed throat 158 thereof (FIGURES 1 and 5) where they receive the impact of the streams of combustion gases emerging from the outlet ports 148 of the combustion chambers 44.

Figures 1, 5, 6:
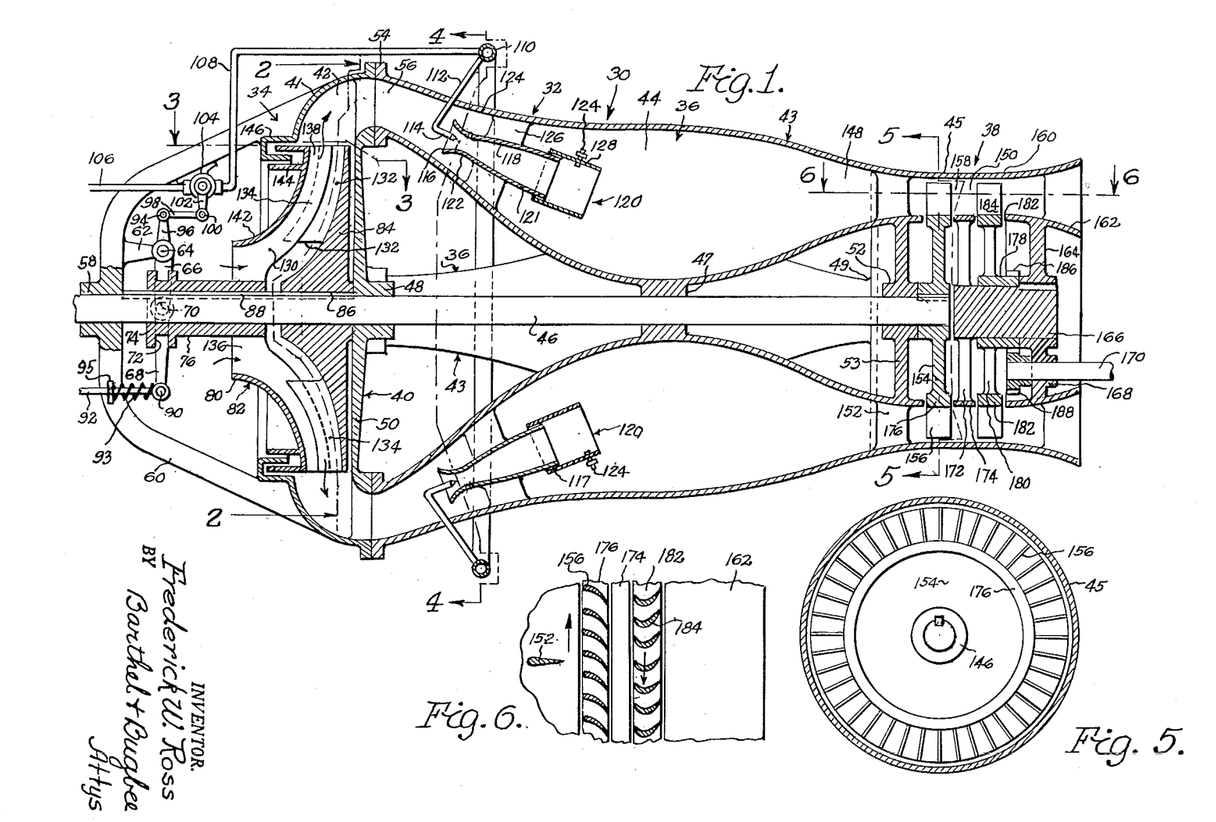
FIGURE 1 is a central longitudinal section through a gas turbine engine, according to one form of the invention, wherein the mass flow of air through the compressor is varied by the provision of a compound rotor having axially relatively movable parts for altering the cross-sectional area of the air stream therethrough.
FIGURE 5 is a cross-section through the compressor driving turbine taken along the line 5—5 in FIGURE 1.
FIGURE 6 is a fragmentary developed longitudinal section through the blades of the compressor-driving and power output turbines, taken along the line 6—6 in FIGURE 1.

The turbine casing 45 has oppositely-flared outer and inner walls 160 and 162 respectively (FIGURE 1). Extending across the rearward end portion of the inner wall 162 is a radial wall 164 containing an elongated cylindrical bearing 166 and a decentered shaft bearing 168, the latter of which rotatably supports the forward end of a power output shaft 170. Mounted on and integral with the bearing 166 is a stationary spacing wheel 172 having an annular rim 174 disposed adjacent the rim 176 of the compressor drive turbine rotor 154 in close proximity thereto. Rotatably mounted on the cylindrical bearing 166 in close proximity to the spacing wheel is the hub 178 of a power output turbine rotor 180, the rim 182 of which is disposed adjacent the rim 174 and carries blades or vanes 184 of air foil cross-section (FIGURE 6) and inclined to the axis of the shaft 46 in an opposite direction from the inclination of the compressor drive turbine blades 156. Mounted on the hub 178 of the output turbine rotor 180 and keyed or otherwise operatively secured thereto is a ring gear 186 which meshes with a pinion 188 which is keyed or otherwise drivingly secured to the inner or forward end of the power output shaft 170.

In the operation of the form of the invention shown in FIGURES 1 to 6 inclusive, suitable liquid fuel, such as a liquid hydrocarbon fuel, is supplied under pressure through the pipe 106 to the valve 104, and high tension electrical ignition current is supplied to the igniters 124 in the combustors 120. Rotatory external power is applied by conventional means, such as by a starting motor (not shown) to the left-hand end of the main shaft 46, rotating the rotor 82 of the compressor 40 and also the compressor drive turbine rotor 154. Meanwhile, the operator pulls on the control rod 92 (FIGURE 1) to swing the lever 66 and open the fuel control valve 104 and at the same time shifts the movable half 80 of the compressor rotor 82 to the left, increasing the cross-sectional area of the peripheral blade channel outlet ports 138 and consequently increasing the flow of air delivered radially outward thereby to the plenum chamber 42 within the peripheral compressor casing portion 41.

As the air is thus pumped through the curved blade channels 134 (FIGURE 2) into the plenum chamber 42, it decreases in velocity while increasing in pressure, so that the curving diverging blade channels 134 serve to some extent as diffusers. As the pressurized air passes from the plenum chamber 42 through the inlet ports 56 of the combustion chambers 44, it enters the inlet ports 116 of the combustion tubes 118 past the fuel spray nozzles 114 which are now spraying fuel through the throats 122 of the venturi-shaped combustion tubes 118. The combustible mixture of air and sprayed fuel is ignited by the igniters 124 as it emerges from the venturi 118. The flaming gases from the combusters 120 intermix with the air that passes around them.

This hot mixtures continues rearwardly through the discharge ports 148 of the combustion chambers 44 into and through the annular blade chamber 150 in the turbine casing 45 engaging the oppositely-inclined blades 156 and 184 of the compressor drive turbine 154 and power output turbine 180 and thence outward through the rearwardly-flared annular turbine casing 45 to the atmosphere. The consequent rotation imparted to the compressor drive turbine rotor 154 in the direction of the arrow in FIGURE 6 rotates the shaft 46 and compressor rotors 82 and 84 counterclockwise, looking from the left hand or forward end of the gas turbine engine 30. As the flames in the combustors 120 are henceforth self-propagating, the igniters 124 may now be de-energized.

In the first form of the present invention (FIGURES 1 to 6 inclusive) as well as in the other forms thereof described and illustrated herein, as the burned gases pass out of their respective combustion chambers and enter their turbine chambers, there is created a back pressure in the combustion chamber against which the compressor operates. This back pressure is accomplished on the one hand in the design of the turbine by a correct selection of the turbine blade area, blade angle and angle of incidence of flow onto the turbine blade so that the resultant gas force vector on the turbine blades causes the back pressure in the combustion chamber to remain nearly constant in magnitude notwithstanding a considerable variation in the rate of mass flow of gas. This can be done by proper blade design. At all mass flow rates of gas, the axial component of the above vector is nearly constant, the vector itself being rotated so that less torque and more thrust is obtained at the lower power. This imparts more push against the thrust bearings so as to do no useful work thereby but the back pressure is maintained without any substantial loss and remains substantially constant over a wide range of variations in mass gas flow. On the other hand (FIGURES 7 and 23), the back pressure referred to can be also in part controlled by properly constricting the cross-sectional gas flow area of the outlet from the combustion chamber or chambers into the turbine chamber.

It will of course be understood that the gas turbine engine of any form of the present invention is not started at full throttle or full power adjustment because of the otherwise great power demand upon the starting motor and the low speed thereof imparted to the engine shaft. In starting the engine, the fuel valve is set at part throttle and the cross-sectional area of the blade channels reduced correspondingly so that the starting motor will be called upon to exert a starting torque to the compressor shaft which is within its power capabilities until sustained combustion occurs when the compressor driving rotor takes over the subsequent rotation of the compressor rotor, the fuel valve may be moved to full throttle and the cross-sectional area of the blade channels moved to their full opening to deliver full power from the engine.

The engine 30 may now be operated at high speed without any further adjustment, and the maximum power is obtained when the movable compressor rotor half is shifted its maximum distance outward or to the left, imparting the maximum cross-sectional area to the rotor outlet ports 138 of the blade channels 134, thereby providing the maximum mass flow of air through the compressor rotor blade channels 134 into the plenum chamber 42.

Assuming that the gas turbine engine 30 is installed in a vehicle where it is necessary to reduce the speed to accord with traffic conditions, the operator now pushes on the control rod 92 (FIGURE 1) shifting the movable compressor rotor half 80 toward the fixed compressor rotor half 84 and consequently reducing the cross-sectional area of the blade channels 134 and the outlet ports 138 thereof, consequently reducing the mass flow of air into the plenum chamber 42 and thence through the combustion chamber inlet ports 56 to the combustors 120. At the same time, the same swinging of the lever 68 by the pushing of the rod 92 reduces the flow of liquid fuel through the valve 104 (FIGURE 1) resulting in a correspondingly reduced flow of sprayed fuel from the spray nozzles 114 into the combustor tubes 118.

As a result, the reduced mass flow of burning gases through the combustion chambers 44 causes a reduction in the power applied to the turbine rotors 154 and 180 and consequently causing a reduction in power delivered by the latter to the power output shaft 170. Since, however, the volume of air now required to be handled by the compressor rotor 82 has been reduced by reducing its blade channel cross-sectional area, consequently reducing the mass air flow therethrough, less power is required to rotate the compressor rotor 82 and therefore the latter is maintained at nearly the same speed of rotation as when it was delivering its maximum output at maximum cross-sectional blade channel area, even though the power applied to the shaft 46 by the compressor drive rotor 154 has been reduced. Moreover, the constriction resulting from the converging of the combustion chambers 44 toward their narrowed outlet ports 148 together with the back pressure set up by the previously-mentioned turbine reaction, sets up a back pressure in the combustion chambers 44 which, transmitted to the plenum chamber 42, maintains the latter at a correspondingly high pressure as at maximum output. This consequently maintains the compression ratio of the compressor unit 140 at a nearly constant figure, notwithstanding the reduction in power output brought about by the reduction in the amount of fuel and compressed air supplied to the combustors 120. For these reasons, the specific fuel consumption of the gas turbine engine 30 is greatly reduced and the operating efficiency maintained correspondingly high even at reduced speeds of the power output shaft 170.

During operation, the operator controls the speed and power output of the power output shaft 170 in the above-described manner by simultaneously controlling the amount of fuel supplied through the valve 104 to the spray nozzles 114 and the mass of air flow through the blade channels 134 and outlet ports 138 of the compressor rotor 82 while maintaining the speed of the latter substantially constant and likewise maintaining the compression ratio nearly constant. In this manner, the operator is enabled to vary the speed of his vehicle without constant shifting of gears and without seriously affecting the efficiency of his engine and obtaining a high fuel economy at reduced speeds.

*Engine With Stationary Compressor Diffuser and Adjustably Shrouded Turbine Blades*

The gas turbine engine, generally designated 200, shown in FIGURES 7 to 13 inclusive, has a construction generally similar in many respects to the gas turbine engine 30 shown in FIGURES 1 to 6 inclusive, hence similar parts are designated with the same reference numerals in order to avoid needless duplication of description. Other parts which differ only slightly in construction or location from those of the gas turbine engine 30 of FIGURES 1 to 6 inclusive are designated with the same reference numerals followed by the suffix letter *a*.

Figure 7:
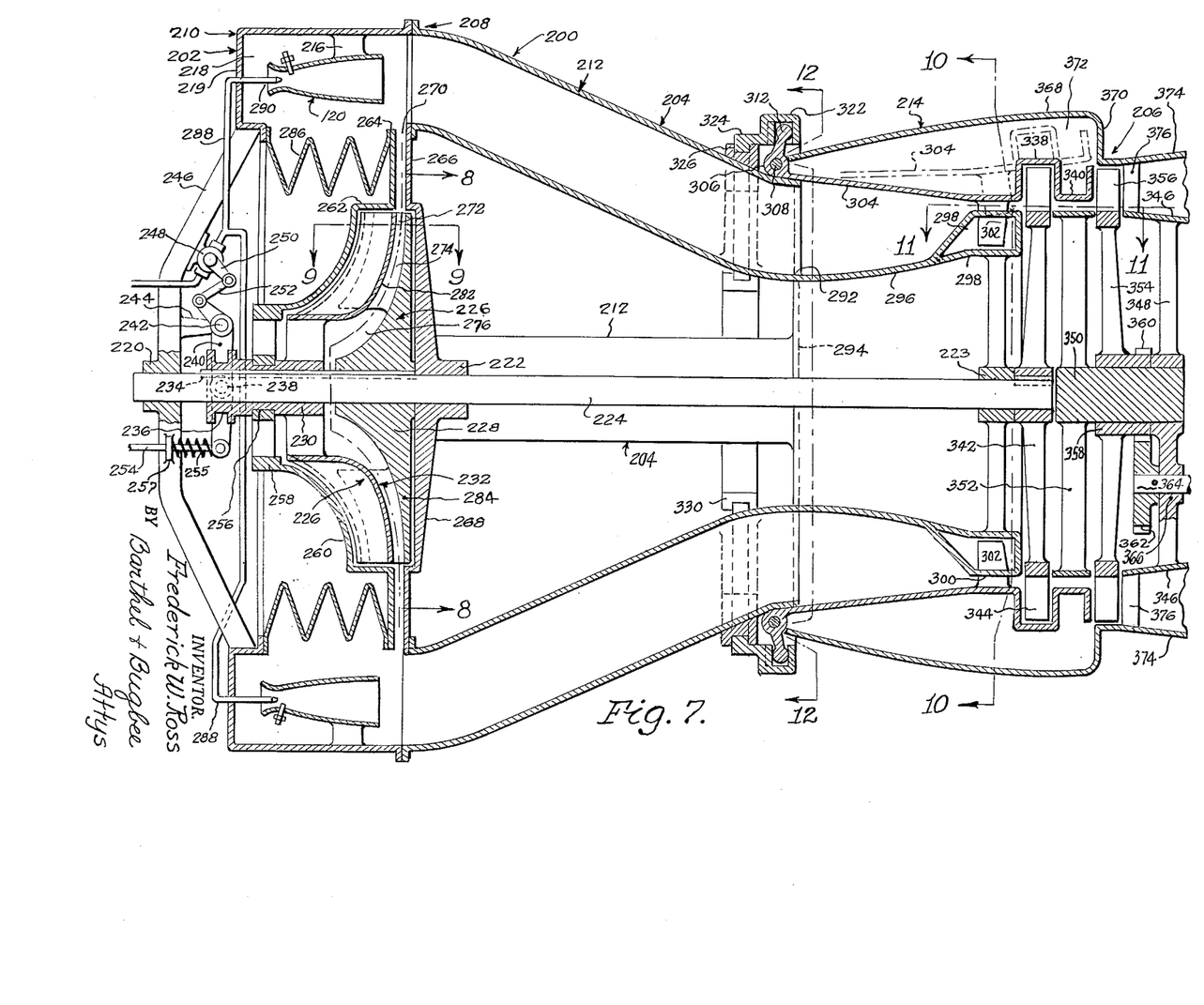
FIGURE 7 is a central longitudinal section through a first modified gas turbine engine generally similar to that of FIGURE 1 but providing a diffuser at the periphery of the compressor rotor, and a variable channel cross-sectional flow area at the turbine unit.
Figures 8, 9, 10, 11, 12, 13:
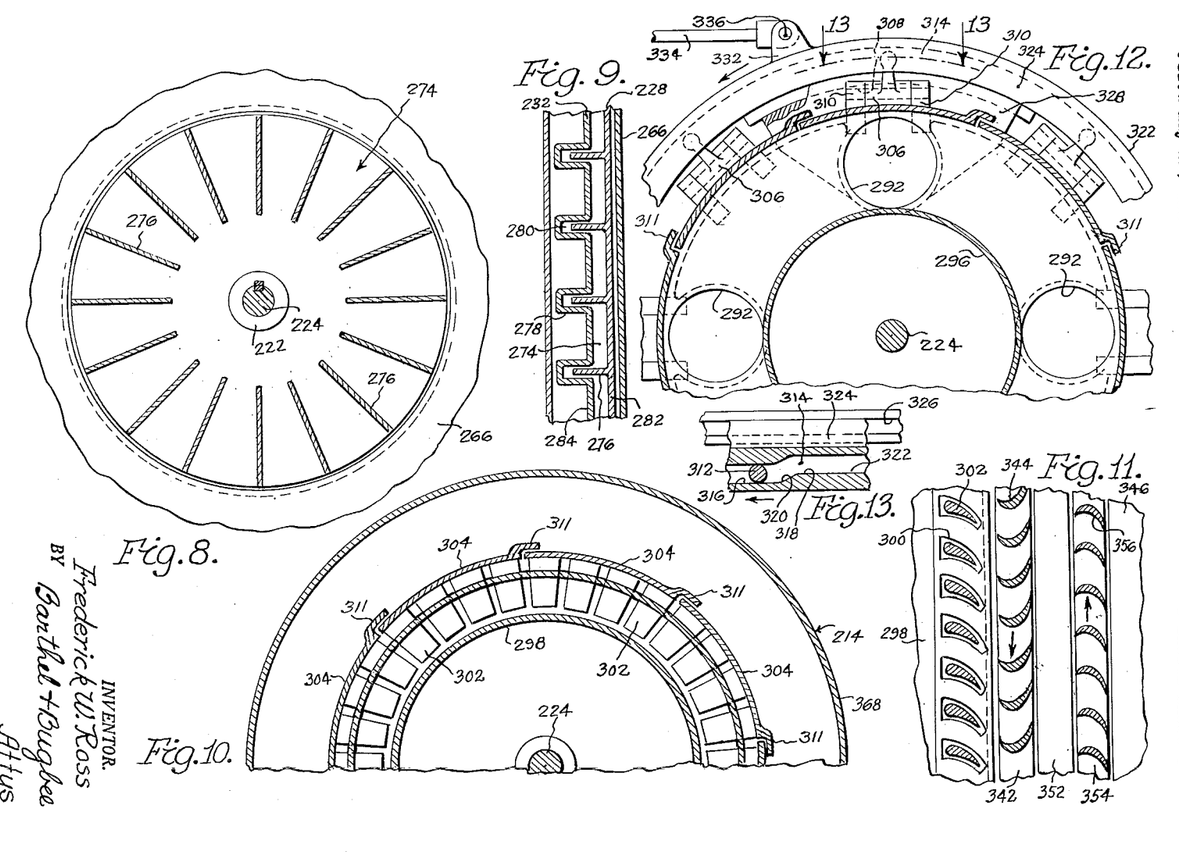
FIGURE 8 is a cross-section taken along the irregular line 8—8 in FIGURE 7.
FIGURE 9 is a developed fragmentary longitudinal section along the line 9—9 in FIGURE 7, showing the means for varying the cross-sectional blade channel area from zero to wide open while maintaining separation of the blade channels 274 from one another.
FIGURE 10 is a fragmentary cross-section through the compressor-driving turbine, taken along the line 10—10 in FIGURE 7.
FIGURE 11 is a developed enlarged fragmentary horizontal section taken along the line 11—11 in FIGURE 7, showing the details of the turbine blades.
FIGURE 12 is a fragmentary cross-section taken along the line 12—12 in FIGURE 7 showing the arrangement for shifting the turbine blade shroud segments.
FIGURE 13 is a developed fragmentary horizontal section taken along the line 13—13 in FIGURE 12, showing details of one of the shroud-shifting cam grooves.

The gas turbine engine 200 has a compressor unit 202, a combustion unit 204 and a turbine unit 206 incased in a casing structure 208 having casings 210, 212 and 214 respectively. The compressor casing 210 as before is connected to individual multiple circumferentially-spaced combustion chamber casings 212 whereas the combustors 120, similar to the combustors 120 of FIGURE 1, are mounted on struts 216 within the annular chamber 218 within the annular peripheral portion 219 of the compressor casing 210. The casing structure 208 as before supports aligned bearings 220, 222 and 223 which in turn rotatably support the main shaft 224 carrying the compressor rotor 226 consisting of the fixed compressor rotor half 228 and the movable compressor rotor half 232 with its hub 230 slidably mounted thereon. The hub 230, as before, is keyed at 234 to slide relatively to the shaft 224 while drivingly secured thereto. Also as before, the hub 230 is grooved as at 236 to be engaged by the shift pins 238 on a yoked shift lever 240 which is pivotally mounted at 242 on a bracket 244 secured to the spider 246 which supports the end bearing 220. Also supported on the spider 246 is the fuel control valve 248, the control arm 250 of which is pivotally connected by a link 252 to the upper end of the lever 240 to the lower end of which a control rod 254 is pivotally connected. A compression spring 255 connected between the shift lever 240 and the lug 257 on the spider 246 counteracts the pressure pushing apart of the rotor halves 228 and 232. The hub 230 is also grooved as at 256 to receive a fixed wheel-like hub 258 for relative rotation therebetween. The hub 258 has attached thereto a bell-shaped wall 260 terminating in an axial flange 262 from which a radial flange 264 in the form of an annular wall projects diametrically outward in a plane approximately co-directional with a radial wall 266 extending outward from the rim of the radial inner wall 268 of the compressor casing 210. The annular spaced walls 266 and 264 define therebetween an annular diffuser space 270, the inner end of which communicates with the outlet ports 272 of the blade channels 274 between the fixed blades 276 on the fixed rotor half 228 and the movable blades 278 (FIGURE 9).

The movable blades 278 are of channel-shaped cross-section (FIGURE 9) having grooves 280 therein into which the fixed blades 276 project in order to separate the blade channels 274 from one another while permitting adjustability therebetween so as to vary the axial width of the blade channels 274 from zero width to full width of the blades 276 by varying the separation of the walls 282 and 284 of the fixed and movable rotor halves 228 and 232. The blades 276 and 278 are straight and radial (FIGURE 8) rather than arcuately-curved as in FIGURES 1 to 6 inclusive, hence the diffuser space 270 is provided for diffusion purposes between the compressor rotor 226 and the annular peripheral chamber 218. An annular bellows 286 closes the space between the diffuser wall 264 and the outer compressor casing 210. The combustors 120 are provided with liquid fuel delivery pipes 288 terminating in spray nozzles 290 similar to the spray nozzles 114 of FIGURE 1.

The tubular combustion casings 212 converge toward the axis of the shaft 224 and enter circumferentially-spaced apertures 292 in the forward end wall 294 of the turbine casing 214, the inner wall 296 of which is provided with a hollow annular end portion 298 provided with circumferentially-spaced peripheral slots 300 (FIG. 11) entered by inclined guide blades 302 projecting radially inward from movable blade shroud segments 304 provided at their forward ends with lugs 306. The segments 304 are pivoted at 308 to spaced ears 310 projecting outwardly from the periphery of the wall 294 (FIGURES 7 and 12). One edge of each segment 304 is provided with a radially offset flange 311 overlapping the adjacent segment 304 to reduce gas leakage therebetween (FIGURE 10). Integral with and projecting outwardly from the lugs 306 are ball-ended arms 312 which are engaged by cam grooves 314 (FIGURE 13) having parallel relatively offset portions 316 and 318 interconnected by laterally-inclined portions 320 and formed in the inner periphery of a shift ring 322. The shift ring 322 has a stepped flange 324 extending axially therefrom and seated in quadrant grooves 326 in sector plates 328 mounted on a central supporting ring 330 (FIGURE 7). Integral with and projecting radially outward from the shift ring 322 are spaced ears 332 to which a control rod 334 is pivotally connected as at 336 (FIGURE 12). The control rod 334 is preferably connected to the same hand lever (not shown) as the control rod 254 for simultaneous operation of both rods.

The rearward ends of the shroud segments are provided with adjacent oppositely-directed arcuate channel portions 338 and 340 respectively, the channel portions 338 facing inward and the channel portions 340 facing outward (FIGURE 7). Mounted on the rearward or right-hand end of the shaft 224 is the hub of a compressor drive turbine rotor 342 of axial flow characteristics and provided with axial flow peripheral blades 344 projecting radially outward past the hollow annular end portion 298 of the inner wall 296 of the turbine housing 214 into the arcuate channel portions 338 of the shroud segments 304.

Extending between the opposite sides of the inner wall 346 of the turbine casing 214 are spokes or struts 348 supporting an elongated cylindrical bearing 350 upon which is mounted a stationary separator wheel 352 disposed between the compressor drive turbine rotor 342 and an axial flow power output turbine rotor 354 having peripheral blades 356 partially masked or completely unmasked by the channel portions 340 at the ends of the shroud segments 304, according to the positions thereof as determined by the rotation of the shaft ring 322, as explained below in connection with the operation of the invention. The turbine blades 344 and 356 like the guide blades 302 are of air foil cross-section, the turbine blades 344 being inclined in the opposite direction to the guide blades 302 and the turbine blades 356 inclined in the same direction (FIGURE 11). Keyed or otherwise secured to the elongated hub 358 of the output turbine rotor 354 is a ring gear 360 which meshes with a gear 362 pinned or otherwise drivingly secured to a power output shaft 364 (FIG- URE 7) mounted in a decentered bearing 366 in one of the struts or spokes 348. The turbine casing 214 is provided with an outwardly-flared central portion 368 terminating in a radial end wall 370 (FIGURE 7) and providing an annular space 372 into which the shroud segments 304 may swing outward around their pivots 308 as indicated by the dotted lines in the upper right-hand corner of FIGURE 7, thereby unmasking or uncovering the turbine blades 344 and 356 simultaneously to a parital or full extent. The end wall 370 at its inner edge joins a rearwardly-flared, generally-axial outer wall 374 which is joined to the inner wall 346 by circumferentially-spaced struts 376.

The operation of the gas turbine engine 200 of FIGURE 7 is generally similar or closely analogous to that of FIGURE 1, in many respects and hence requires description only in the ways in which it differs. After the turbine engine 200 has been started in the manner described above in connection with FIGURE 1, the continued flow of burning gas through the combustion tubes or casings 204 is deflected by the guide blades 302 and acts against the turbine blades 344 and 356 to rotate the turbine rotors 342 and 354 in opposite directions as before, driving the compressor rotor 226 through the shaft 224 and delivering power to the output shaft 364. Diffusion of the air from the compressor rotor 226 to the peripheral annular chamber 218 is accomplished mainly in the diffusion space 270 because the straight radial compressor blades 276, 278 effect little diffusion in the blade channels 274 themselves.

To vary the speed and power output of the output shaft 364 while maintaining the compressor rotor 226 at substantially the same speed and maintaining the compression ratio substantially unchanged, the operator, as before, pushes on the control rod 254 to reduce the cross-sectional area of the blade channels 274, causing a reduced mass flow of air through their peripheral outlet ports 272. At the same time, the axial sliding of the hub 230 to the right carries with it, without rotation, the bell-shaped wall 260 and diffuser wall 264 to narrow the separation of the annular diffuser plates 264 and 266 and consequently narrow the annular diffuser space 270. Rotation of the bell-shaped wall 260 is prevented by the accordion-shaped closure member 286. For the same reasons described above in connection with FIGURE 1, the compressor rotor 266 receives less power from the compressor turbine 342 but is required to handle a lower mass flow of air at reduced power so that one effect counteracts the other and enables the speed, the compression ratio and consequently the efficiency of the engine 200 to be maintained at a high level, with little decline in the compression ratio. At the same time, however, the reduced flow of burning gases to the output turbine blades 356 at part power delivers less power to the output shaft 364 and consequently causes the vehicle in which the engine 200 is mounted to slow down for traffic conditions or for other reasons.

The constriction of the outlet ends of the combustion casing or tubes 212 by the annular enlarged end portion 298 and the position of the segments 304, as in the engine 30 of FIGURE 1, with the adjustable constriction effected by the segments 304, sets up a back pressure which maintains a high compression ratio in the chamber 218 and combustion casings or tubes 212, hence maintains a low fuel consumption and gives a consequently high fuel economy.

*Engine With Governor-Controlled Compressor*

Figures 14, 15, 16, 19, 20, 21:
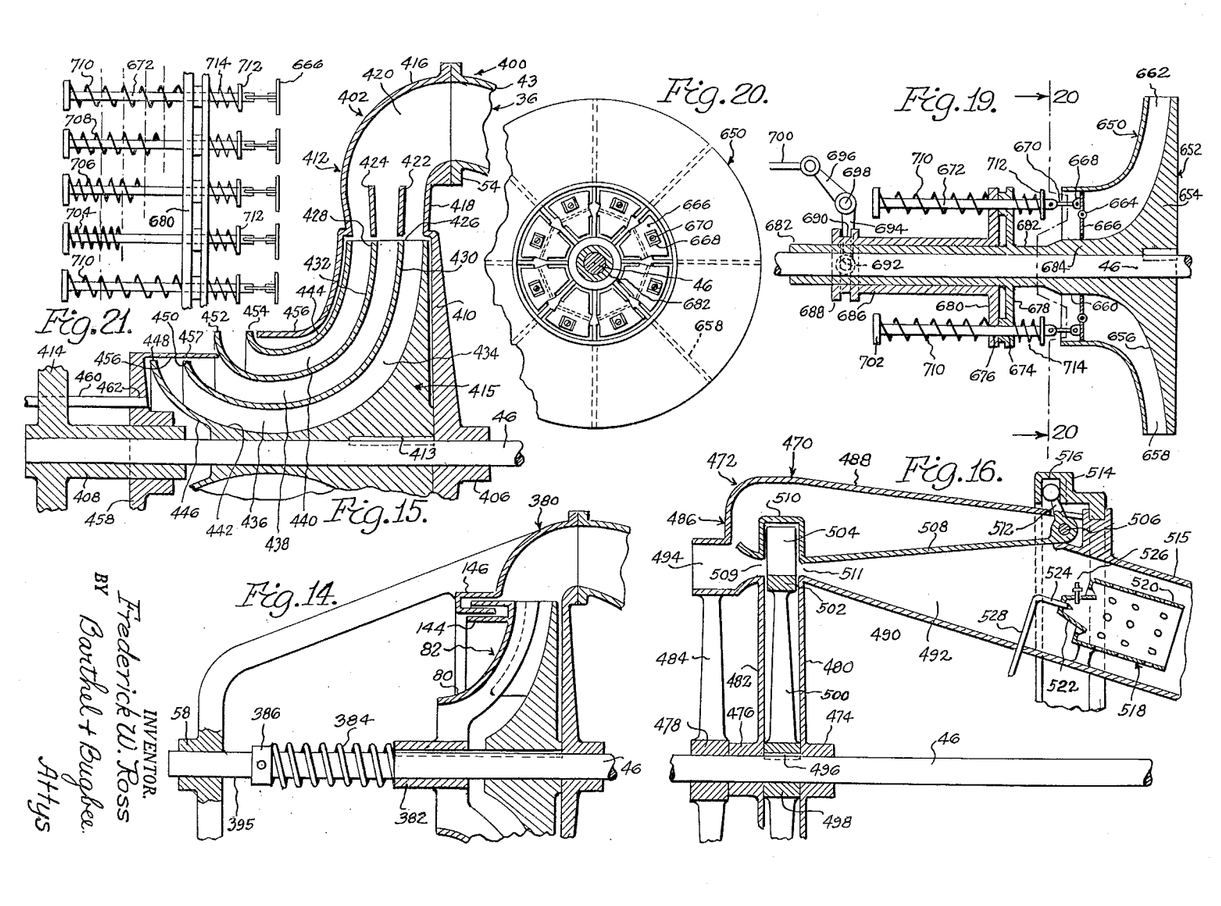
FIGURE 14 is a fragmentary central longitudinal section through the compressor unit of a second modified gas turbine engine wherein the movable compressor rotor half is shifted automatically in response to the action of a speed-responsive governor.
FIGURE 15 is a fragmentary central longitudinal section through the compressor unit of a third modified gas turbine engine wherein the compressor is provided with multiple longitudinal air passageways capable of being sequentially valved.
FIGURE 16 is a fragmentary central vertical section through the compressor and combustor units of a fourth modified gas turbine engine employing an axial flow compressor.
FIGURE 19 (Sheet 5) is a fragmentary vertical section through a slight modification of the compressor unit of FIGURE 1 wherein the flow of air through the multiple blade channels of the radial flow compressor rotor is controlled by sequentially-operated butterfly valves.
FIGURE 20 is a cross-section taken along the line 20—20 in FIGURE 19, showing the butterfly valves.
FIGURE 21 is a developed top plan view of five of the butterfly valves and their sequential operating mechanism shown in FIGURES 19 and 20.

The gas turbine engine, generally designated 380, shown in part in FIGURE 14, is similar in construction, for the most part to the engine 30 shown in FIGURE 1, with a similar turbine arrangement and similar parts are designated with the same reference numerals. In FIGURE 14, however, the hub 382 of the movable rotor half 80 is shorter but otherwise the same as the hub 76 shown in FIGURE 1. A long compression spring 384 which has a fully-compresesd length several times the total axial movement of movable rotor half 80, is compressed between the end of the hub 382 and a collar 386 pinned or otherwise securely fastened to the shaft 46. The spring 384 urges the movable rotor half 80 to the right in its mass-flow-reducing direction. The combustors 120 and valve 104 with their connected piping are omitted from FIGURE 14 to simplify the drawing, but are the same as shown in FIGURE 1.

The operation of the engine 380 is similar to that of the engine 30 of FIGURE 1, with the exception of the fact that only the fuel control valve is controlled manually to reduce the fuel supplied to the combustors, consequently reducing the power output from the turbine. As the power delivered to the shaft 46 diminishes, its speed declines. During operation, the pressure in channels 134 caused by the action of the compressor rotor 80 presses against end wall 142 and urges movable rotor half 82 to the left against the compressive force of spring 384. A reduction of fuel rate to combustors 120 reduces the power delivered by compressor driving turbine 154. This reduces its speed, the mass flow through channels 134 and the pressure against end wall 142. Accordingly, the force in spring 384 moves movable rotor half 82 to the right, decreases the air mass flow through channels 134, reduces the load on the rotor 80, which then returns approximately to its original speed.

In this way, the balance between the compressive force of spring 384 and the resultant force on end wall 142 caused by the compression will maintain the compression in rotor 80 and consequently constitutes a governor which maintains substantially constant compressor speed and hence compression ratio in the engine. The spring 384 being several times as long as the total axial movement of the movable rotor half 82, its resultant compressive force and hence the compression ratio caused by the rotor 80 can be made to decrease only slightly and hence is relatively independent of axial position of the movable rotor half 82.

*Engine With Axially-Valved Multiple-Channel Compressor Rotor*

The modified gas turbine engine, generally designated 400, shown in part in FIGURE 15 has all of its modification in the compressor unit, generally designated 402, the portion to the right thereof containing the combustion and turbine units being the same as the combustion unit 36 and turbine unit 38 of FIGURES 1 to 6 inclusive. The compressor unit 402, as in FIGURE 1, has a shaft 46 driven from the compressor drive turbine, such as the compressor drive turbine rotor 154 of FIGURE 1, and rotatably supported in the bearing 406 and outboard bearing 408 disposed respectively in the inner end wall 410 of the compressor housing or casing 412 and the spider 414 connected thereto in the same manner as the spider 60 in FIGURE 1. Keyed or otherwise operatively secured at 413 to the shaft 46 is a compresor rotor, generally designated 415.

The compressor housing 412 has an outer or peripheral wall 416 which with a radial extension 418 of the radial inner wall 410 is flanged to engage the correspondingly-flanged intake ends 54 of the combustion ducts 43 of the combustion unit 36 shown in full in FIGURE 1. Mounted in the peripheral chamber 420 in the compressor housing 412 approximately at the same radius as the radial extension wall 418 are spaced air guide partitions 422 and 424 which are aligned with the outer ends 426 and 428 of longitudinally-spaced circumferentially-extending curved partition walls 430 and 432 intersecting the blades 434 and dividing them into multiple blade channels 436, 438 and 440 respectively.

The inner blade channel 436 is bounded by the rotor inner wall 442 and the outer blade channel 440 is bounded by an outer wall 444 curved similarly to the partitions 430 and 432. As will be seen from FIGURE 15, the rotor 415 has a curved bell-shaped extension 446 similar in curvature to the corresponding ends of the partitions 430 and 432 and terminating at edges 448 and 450 respectively at the same radii from the axis of the shaft 46. The partition 432 and the outer rotor wall 444, on the other hand, terminate at their inner ends at circular edges 452 and 454 disposed on larger diameters than the edges 448 and 450 of the extension 446 and blade partition 430, and the outer casing or housing wall 416 has an axial cylindrical extension 456 which terminates in close proximity to the edge 454. While three sets of blade channels 436, 438, 440 have been shown and described, it will be understood that a greater number may be provided, if desired.

In order to close and valve the inlet ends of the blade channels 436 and 438, there is provided a hollow cylindrical sleeve or valve member 457 integral with and extending axially from a radial circular wall or disc 458 which is bored to receive and slide axially along the outer surface of the bearing 408, which is of cylindrical configuration to permit such sliding. A control rod 460 having one end anchored as at 462 in the disc 458 and the other end connected to a control lever or hand wheel enables the valve member or sleeve 457 to be slid manually into masking or valving relationship to the inlets of the blade channels 436 and 438 to cover them wholly or partially, as desired, leaving only the blade passageway 440 free from such valving action.

In the operation of the gas turbine engine 400, the same procedure is followed as described above in connection with the engine 30 of FIGURES 1 to 6 inclusive, in starting the engine, the action of the radial flow rotor 415 being similar to that of the radial flow rotor 82 of FIGURE 1 in discharging air under pressure into the annular peripheral chamber 420. In starting, the load on the compressor rotor 415 is reduced by leaving only the blade channel 440 open. At full speed, the inlets of all three blade channels 436, 438 and 440 of each blade 434 are opened when the valve sleeve 457 is retracted fully to the left, so that the maximum output of the rotor 415 is obtained and the maximum speed and power consequently obtained from the engine 400 as a result of the fuel gases burning in the combustion tubes or casings 43, as explained above in connection with the engine 30 of FIGURE 1.

When, however, it is desired to reduce the power output and consequently the speed of the output shaft (170 in FIGURE 1), the operator of the engine 400 of FIGURE 15 pushes on the control rod 460 to slide the sleeve 457 over either or both of the blade channels 436 and 438, thereby reducing the mass flow of air from the rotor 415 into the annular peripheral chamber 420 and hence reducing the flow of combustion gases to and through the turbines. Since, however, the reduced power of the compressor driving turbine (154 of FIGURE 1) is compensated for by the reduction in the volume of air required to be handled by the compressor rotor 415, the latter retains its high speed and consequently a high fuel economy and a high compression ratio are retained even at those speeds.

*Engine With Adjustable Axial Flow Compressor*

FIGURE 16 shows another modified gas turbine engine, generally designated 470 as regards its compressor unit 472 only, the combustion and turbine units being omitted because similar to those shown at 36 and 38 in FIGURE 1. As before, the shaft 46 is connected to and driven by a compressor driving turbine (154 in FIGURE 1), and is supported in bearings 474, 476 and 478 forming parts respectively of the radial walls 480 and 482 and radial struts 484 of the compressor casing 486. The latter has radially-spaced approximately conical outer and inner peripheral walls 488 and 490 defining a peripheral annular chamber 492 therebetween having a restricted inlet 494 at the forward end thereof immediately outward radially from the spokes or struts 484.

Keyed or otherwise operatively secured at 496 to the shaft 46 is the hub 498 of an axial flow rotor 500, the rim 502 of which carries circumferentially-spaced radial blades 504 of air foil cross-section similar to those shown in FIGURES 6 and 11 and similarly inclined to the direction of rotation of the rim 502 and to the axis of rotation of the shaft 46. Pivotally mounted on the pivot pins 506 carried by the outer compressor casing wall 488 are shroud or masking sectors 508 similar in their general construction to the shroud or masking sectors 304 of FIGURE 7 and similarly provided with arcuate channel-shaped portions 510 at their free ends in line with and adapted to move inward or outward relatively to the rotor blades 504 to partially or wholly uncover the latter, and restrict or enlarge annular air inlet and outlet passageways 509 and 511 on opposite sides thereof. As in the case of the masking or shroud segments 304 of FIGURE 7, the swinging of the segments 508 is controlled by ball-ended arms 512 operated by a rotary ring 514 containing a cam groove 516 engaging the end of the arm 512, as described above in connection with FIGURES 12 and 13 of the form of the invention shown in FIGURE 7. Extending downwardly and rearwardly from the right-hand end of the compressor casing 486 are circumferentially-spaced tubular combustion casings 515 similar to the combustion tubes 212 of FIGURE 7 and containing any type of combustors, such as, for example, the improved combustors 120 of FIGURES 1 and 7, or the conventional combustors 518 of FIGURE 16. These consist of perforated cylindrical members 520 each having a conical perforated end wall 522 with a fuel spray nozzle 524 and electrical igniter 526 such as a spark plug mounted therein. The fuel spray nozzle 524 is connected by a fuel supply pipe 528 to a fuel supply system similar to that shown at the left-hand end of either FIGURE 1 or 7. It will be understood that any other suitable combustor may be used in place of the combustor 518.

The operation of the engine 480 also follows a similar starting procedure as the engines 30 and 200 of FIGURES 1 and 7. The rotation of the shaft 46 by the starting motor (not shown) and the consequent rotation of the compressor rotor 500 causes air to be drawn through the inlet 494 of the compressor housing 472 and discharged into the chamber 492 thereof, the masking or shroud segments 508 being swung outward to their part-way open extent so as to permit a sufficient mass flow of air to the combustors 518 in the combustion casings 516. When the engine 470 has reached the self-sustaining flame propagation stage of its operation, its speed may be increased by opening the fuel control valve and further unmasking the rotor blades 504. If it is desired to reduce the power of the output shaft thereof, such as the output shaft 170 in FIGURE 1, the flow of fuel to the spray nozzles 524 is reduced and likewise the mass flow of air is reduced through the air inlet and outlet passageways 509 and 511 into the air chamber 492 and thence into the combustion casings 516. The consequent reduction in power of the compressor driving turbine (154 in FIGURE 1) applied to the shaft 46, is however, compensated for by the masking of the blades 504 of the compressor rotor 500 as the segments 508 are swung inward to do so, causing a smaller mass flow or volume of air to be required to be handled and consequently requiring a smaller expenditure of power. Accordingly, the rotor 500 of the compressor unit 472 maintains its high speed and consequently the engine maintains its high compression ratio even though the speed and power of the power output shaft (170 in FIGURE 1) is reduced.

*Gas Turbine Engine Compressor With
Dual-Sided Rotor*

Figures 2, 3, 4, 17, 18:
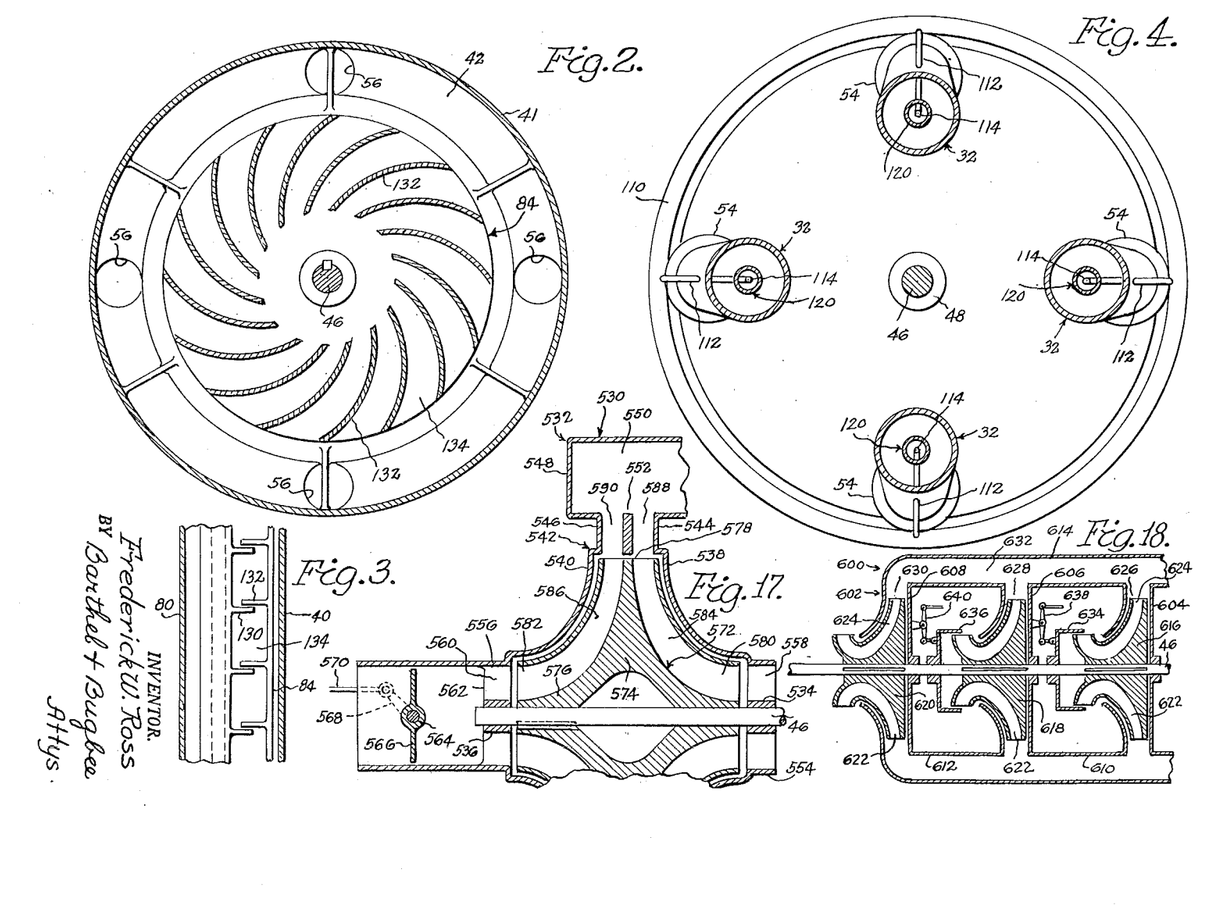
FIGURE 2 is a cross-section taken along the irregular line 2—2 in FIGURE 1.
FIGURE 3 is a developed fragmentary longitudinal section taken along the line 3—3 in FIGURE 1, showing the relative overlapping of the compressor rotor blade parts.
FIGURE 4 is a cross-section through the combustion chamber and combustors taken along the line 4—4 in FIGURE 1.
FIGURE 17 (Sheet 2) is a fragmentary longitudinal section through the compressor unit of a fifth modified gas turbine engine having a dual radial flow compressor rotor.
FIGURE 18 (Sheet 2) is a fragmentary longitudinal section through the compressor unit of a sixth modified gas turbine engine employing tandem radial flow compressor rotors arranged for sequential valving.

The gas turbine engine, generally designated 530, shown in part in FIGURE 17 differs only in the compressor unit 532 from the foregoing engines, the combustion and turbine units being of any suitable types such as those shown at 36 and 38 in FIGURE 1. The shaft 46 as before is supported in bearings 534 and 536 in the opposite bell-shaped walls 538 and 540 of the compressor casing, generally designated 542, and curve toward one another into parallel portions 544 and 546 respectively opening into an annular peripheral portion 548 enclosing an annular peripheral air chamber 550 containing a radial annular partition 552. At their inner or axial ends the casing walls 538 and 540 terminate in tubular portions 554 and 556 respectively having inlet passageways 558 and 560 respectively. The bearings 534 and 536 for the shaft 46 are mounted in diametral struts 562 in these passageways. The casing portion 556 is elongated and contains a diametral shaft 564 upon which is mounted a butterfly valve 566 controlled by an arm 568 to which is pivotally connected a control rod 570.

Keyed or otherwise drivingly secured to the shaft 46 is a double-sided compressor rotor, generally designated 572 and having a central core 574 which is broad at the hub 576 and tapers to a thin peripheral edge 578 in line with the annular peripheral partition 552. The rotor core 574 on its opposite side carries two sets of oppositely curving blades 580 and 582 respectively forming blade channels 584 and 586 respectively curving outward from the inlet passageways 558 and 560 to the diffusion passageways 588 and 590 between the annular partition 552 and the casing side wall extensions 544 and 546.

In the operation of the gas turbine engine 530, the starting procedure and running procedure is the same as before and the compressor unit 532 is coupled to combustion and turbine units of any suitable type such as the combustion unit 36 and turbine unit 38 of FIGURE 1. During the starting procedure, the butterfly valve 566 is shifted to a partway open position so as to reduce the load upon the compressor rotor 574. After starting, for full power the valve 566 is shifted to its wide open position with the inlet passageways 560 and 558 thus wide open. To reduce the power output and consequently the speed of the vehicle, the fuel into the combustors is reduced as before, causing a reduction in power on the compressor driving turbine (154 in FIGURE 1) and a reduction in power applied to the shaft 46, which, however, the operator compensates for by closing the butterfly valve 566 so as to cut down the mass flow of air through the blade channels 586. The consequent reduction of power required by the rotor 572 thus counteracts the reduced power applied to the shaft 46 and the speed of the rotor 572 therefore remains high even at part throttle. For the same reasons heretofore described, the compression ratio also remains high.

*Gas Turbine Engine With Tandem Rotor Compressor*

The gas turbine engine, generally designated 600, shown in part in FIGURE 18 also differs only in the compressor unit 602 from the foregoing engines, the combustion and turbine units being of any suitable types such as those shown at 36 and 38 in FIGURE 1. The shaft 46 as before is rotatably supported in axially-spaced radial outer casing walls 604, 606 and 608 which are separated from one another by the tandem sections 610 and 612 respectively of circumferentially-spaced multiple tubular casings or conduits 614. Keyed or otherwise operatively secured to the shaft 46 are radial flow compressor rotors 616, 618 and 620 respectively mounted in tandem in axially-spaced relationship and having blades 622 of approximately J-shaped form providing radial flow blade channels 624 which discharge into annular passageways 626, 628 and 630 at axially-spaced locations into the axially-elongated chambers 632 within the tubular casings 614. The three compressor rotors 616, 618 and 620 are substantially duplicates in construction. The axial ends of the blade channels 624 of the rotor 620 are left unimpeded whereas those of the rotors 616 and 618 are adapted to be partially or fully masked or valved by cup-shaped hollow cylindrical valve members 634 and 636 slidably mounted on the shaft 46 and adapted to be individually reciprocated by levers 638 and 640.

In the operation of the engine 600, the starting procedure is as described above in connection with the foregoing engines, such as the engine 30 of FIGURE 1. During starting, the inlets of the blade channels 624 are partly covered or masked (FIGURE 18). At full power operation, the valve members 634 and 636 are withdrawn fully to the left, so that all three compressor rotors 616, 618 and 620 discharge their full mass flow quota of air into the casing chambers 632, whence it flows into the combustion chamber or chambers of the combustion unit, such as those of the combustion unit 36 of FIGURE 1, and thence into the turbine unit 38 thereof. If the operator desires to reduce the speed and consequently the power output, he reduces the rate of fuel supplied to the combustion unit (38 of FIGURE 1) and consequently reduces the power output of the power output shaft (170 in FIGURE 1). The consequent reduction of power to the shaft 46 by the reduced power of the compressor driving turbine (154 in FIGURE 1) is compensated for by sliding either one or both of the cup-shaped valve members 634 and 636 to the right over the entrances to the blade channels of the rotors 616 and 618.

This action reduces the mass flow of air to be handled by these rotors and consequently reduces the power demand made by the rotors 616, 618 and 620 upon the shaft 46. As a consequence, the compressor rotors 616, 618 and 620 continue to rotate at high speed and, for reasons already explained above, the compression ratio remains high and the fuel economy remains at a high level.

*Gas Turbine Engine With Radial Compressor and Sequentially-Valved Compressor Blade Channel Inlets*

The gas turbine engine, generally designated 650, shown in FIGURES 19 to 21 only as regards its radial flow adjustable rotor unit 652, has the same combustion unit 36 and turbine unit 38 shown in FIGURE 1. In other words, the adjustable flow rotor unit 652 of FIGURE 19 may be substituted bodily for the adjustable flow rotor 82 of FIGURE 1, together with its adjusting sleeve 76 and lever 66 to form the modified engine 650. From FIGURE 19 it will be seen that the radial flow rotor 654 of the adjustable flow rotor unit 652 is in itself a one-piece rotor with elbow-shaped blade channels 656 formed between the radial blades 658 (FIGURES 19 and 20). As in the dual compressor rotor 572 of FIGURE 17, the blade channels 656 have relatively wide axially-directed inlet ports 660 from which the blade channels 656 taper in width toward the outlet ports 662 at the periphery of the rotor 654. Mounted in each of the inlet ports 660 and extending thereacross are valve pivot rods 664 upon which are mounted butterfly valves 666 of truncated sector shape to fit the correspondingly truncated sector-shaped inlet ports 660 (FIGURE 20). Mounted on each valve 666 radially outward from the pivot rod 664 thereof is a lug 668 to which is pivoted to one end of a plunger 672 of which there are eight, only five being shown in FIGURE 21, covering a half revolution, the remaining half revolution being of similar construction and arrangement.

The plungers 672 are reciprocably mounted in coaxial bores 674 and 676 (FIGURE 19) in fixed and slidable discs 678 and 680 respectively. The disc 678 is formed as an integral part of the tubular shaft 682 forming an extension of the hub 684 of the compressor rotor 654, whereas the disc 680 is formed integral with the sliding sleeve 686 slidably mounted on the outside of the tubular shaft 682 through which the compressor drive shaft 46 passes. The rotor 652 is, of course, keyed or otherwise operatively connected to the drive shaft 46 for rotation thereby in response to the action of the turbine thereof, such as the turbine rotor 154 of the turbine unit 38 in FIGURE 1. The sleeve 686 has a grooved shift collar 688 containing an annular groove 690 engaged by the diametrically opposite pins 692 on the yoked end 694 of a shift lever 696 pivotally mounted upon the shaft 698 and having an operating rod 700 pivotally connected to its outer end. Each plunger 672 is provided at its forward end with a head 702 serving as an abutment for one of eight compression springs 704, 706, 708, 710, arranged in diametrically opposite pairs. The springs of each pair are of equal lengths whereas the four springs of each set are of progressively increasing lengths. In other words, there are two very short springs 704 arranged diametrically opposite one another, two short springs 706 similarly arranged diametrically opposite one another on plungers 672, two medium length springs 708 similarly arranged diametrically opposite one another and two long springs 710 also arranged diametrically opposite one another. A set of springs consists of one of each pair of springs 704, 706, 708, 710 of different lengths (FIGURE 21). These springs at their forward ends abut the plunger heads 702 and at their rearward ends successively engage the slidable disc 680 as the sleeve 686 thereof is shifted to the left (FIGURE 19), as explained below in connection with the operation of the invention.

Arranged at the rearward ends of the plungers 672 adjacent their pivotal connections to the links 670 are spring abutment washers 712 between which and the fixed disc 678 are arranged like springs 714 of less force than the springs 704, 706, 708 and 710 so as to be overpowered thereby, but normally capable of holding the butterfly valves 666 shut.

In the operation of gas turbine engine 650 with the adjustable flow compressor rotor unit 652 of FIGURES 19 to 21, inclusive, let it be assumed that the rotor unit 652 is installed in the engine 30 of FIGURE 1 in place of the rotor 82 and its accompanying adjustment devices as explained above, and that the engine 650 is to be operated first at high speed and then at reduced speed. The engine 650 is started, as explained in connection with the operation of the engine 30 of FIGURE 1, with the blade channels 656 of the rotor 654 partway open with the control rod 700 pushed partway to the right, sliding the sleeve 686 and its integral disc 680 partway to the left and engaging and compressing only one pair of springs 710 while swinging to their open positions the thereby operated pair of sector-shaped butterfly valves 666 around their pivot rods 664. As the rotor 654 is rotated by the starting motor (not shown) the engine 650 starts. The rotor 654 is subsequently continued in rotation by its own turbine rotor 154 (FIGURE 1) as the combustors 120 deliver a steady flow of burning fuel gas to the blades 156 thereof.

Thereafter the operator shifts the sleeve 686 and disc 680 to the extreme left, compressing all of the springs 704, 706, 708 and 710 and shifting all of their plungers 672 to the extreme left, opening all of the valves 666, so that the engine 650 starts and reaches its maximum speed and power, if such is desired. Let it be assumed, as before, that the engine 650 equipped with the adjustable compressor rotor unit 652 is mounted in a vehicle which has to be slowed down in traffic. To do so the operator then pulls on the control rod 700 to shift the sleeve 686 and its disc 680 rearwardly or to the right in FIGURE 19, and at the same time shifts the fuel control valve 104 of FIGURE 1 to reduce the fuel supplied to the combustors 120. The former action relaxes the compression exerted upon the different-length pairs of springs 704, 706, 708 and 710 sequentially in pairs and then permits the springs 714 to push simultaneously upon all of the washers 712 to further shift the plungers 672 rearwardly to swing closed the valves 666. Meanwhile, of course, the discs 678 and 680 are rotating rapidly in synchronism with the rotor 654 and drive shaft 46, causing the plungers 672 and their associated parts to move in a cylindrical orbit coaxial with the drive shaft 46.

As the valves 666 close, pair by pair, the inlets 660 of their respective blade channels 656, the mass air flow through the compressor rotor 654 is correspondingly reduced and consequently its power demand is likewise reduced. As a consequence, the speed of the rotor assembly 652 remains high and the compression ratio correspondingly high, resulting in high efficiency of the engine 650 and consequently low fuel consumption, as explained above more fully in connection with the engine 30 of FIGURE 1. It will also be evident that the plungers 672 may be shifted sequentially in pairs by the use of a ring with cams similar to the cam-equipped shift ring 322 of FIGURES 7, 12 and 13.

*Gas Turbine Engine With Rotary Diffuser Compressor*

Figures 22, 24, 25:
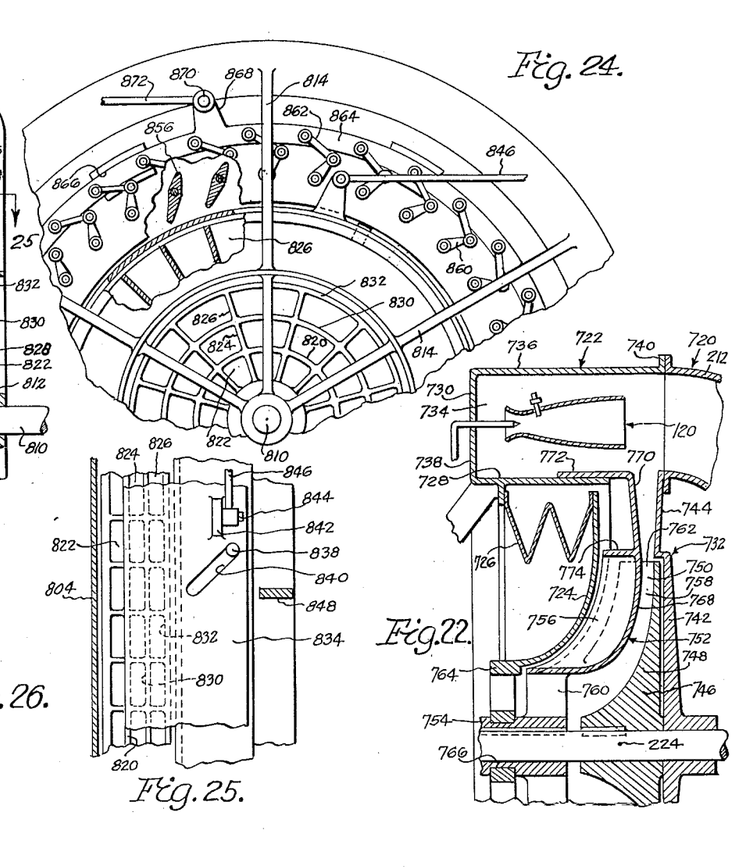
FIGURE 22 (Sheet 6) is a fragmentary central longitudinal section through another slight modification of a compressor unit of the gas turbine engine of FIGURE 1, provided with a rotary diffuser at the outlets of the radial flow compressor rotor.
FIGURE 24 is a fragmentary right-hand end elevation of the turbine unit shown in FIGURE 23, partly broken away to disclose the outer ends of the radial flow turbine blades and their flow-control butterfly valves.
FIGURE 25 is a developed fragmentary longitudinal section showing details of the turbine channel masking sleeve.

The gas turbine engine, generally designated 720, shown in FIGURE 22, has a compressor unit 722 which is a slight modification of the compressor unit 208 of the gas turbine engine 200 of FIGURES 7 to 13 inclusive in that one wall of its diffuser is rotatable rather than stationary, as in the engine 200. In the engine 720, the bell-shaped wall 724, like the bell-shaped wall 264 in FIGURE 7 is attached to its respective bellows 726 and is consequently held thereby against rotation. The wall 724 of the compressor unit 722 of FIGURE 22 takes no part in the diffusion but terminates short of the annular inner wall 728 of the peripheral casing portion 730 of the compressor casing, generally designated 732. As in FIGURE 7, the combustors 120 are mounted in the annular chamber 734 between the inner and outer casing walls 728 and 736 and the radial forward end wall 738 thereof. The opposite wall 740 is flanged and apertured at intervals to receive the correspondingly flanged upper ends of the combustion chambers 212 similar to those of the same number in FIGURE 7. In a similar way, the radial rearward end wall 742 of the casing 732 has a slightly conical diffuser extension wall 744 extending outward toward the rearward end wall 740.

As in FIGURE 7, the compressor drive shaft 224 carries the fixed half 746 of the compressor rotor, generally designated 748, and having radial blades 750 similar to the blades 276 of FIGURES 7 and 8. The adjustable rotor half 752 mounted on the sliding hub 754 which, like the fixed rotor half 746, is keyed or otherwise drivingly secured to the shaft 224 has blades 756 thereon overlapping the blades 750 so as to form blade channels 758 of adjustably variable cross-sectional areas, with axial inlet ports 760 and radial outlet ports 762. The hub or spider 764 to which the stationary bell-shaped wall 724 is attached engages the groove 766 in the hub 754 so as to permit the latter to rotate relatively thereto.

The adjustable rotor half 752 at the outer end of its wall 768 is provided with a diffuser extension wall 770 of shallow conical form disposed approximately codirectional with the opposite diffuser wall 744. In order to reduce air leakage, the wall 770 is provided at its outer edge with a cylindrical closure wall 772 overlapping but having a radial clearance with the cylindrical inner wall 728 of the peripheral casing portion 730 to prevent rubbing thereon. An annular flange 774 extends from the junction of the wall 768 and its extension 770 to a location in close proximity to the stationary wall 724 (FIGURE 22) so as to substantially close the space therebetween.

The operation of the engine 720 of FIGURE 22 is almost identical with that of the engine 200 of FIGURES 7 to 13 inclusive, hence requires no repetition and duplication. The mechanical difference between these two engines resides in the fact that the forward diffuser wall 770 in FIGURE 22 rotates with the adjustable rotor half 752, whereas the diffuser wall 264 of FIGURE 7 is held stationary by the bellows 286.

*Gas Turbine Engine With Multiple-Channel Radial Flow Output Turbine*

Figures 23, 26:
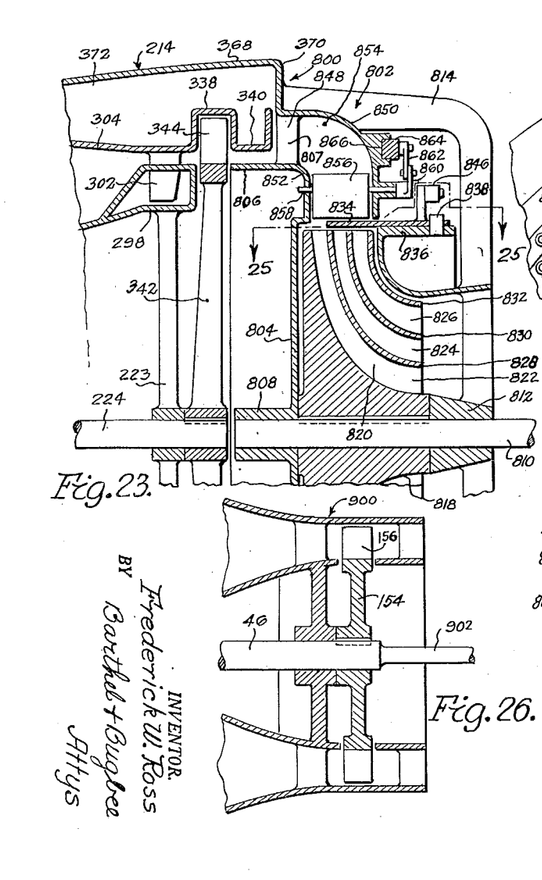
FIGURE 23 is a fragmentary central longitudinal section through a modification of the turbine unit of the gas turbine engine of FIGURE 7, wherein a radial flow output turbine is employed in place of the axial flow output turbine of FIGURE 7.
FIGURE 26 is a fragmentary central longitudinal section of a simplification of the turbine unit of FIGURE 1, wherein the compressor driving turbine is directly coupled to the power output shaft for direct drive of a constant speed machine, such as an electrical generator.

The gas turbine engine, generally designated 800, shown in FIGURES 23 to 25 inclusive, is for the most part the same as the engine 200 of FIGURES 7 to 13 inclusive, and corresponding parts are therefore designated with the same reference numeral. The engine 800 differs from the engine 200 in replacing the axial flow power output turbine 354 of the turbine unit 206 (FIGURE 7) with a multi-channel radial flow turbine unit, generally designated 802, with adjustable channel valving.

The central portion 368 of the turbine casing 214 of the engine 200 of FIGURE 7 and of the engine 800 of FIGURE 23 extends rearwardly as far as the radial end wall 370 beyond the compressor driving rotor or turbine 342. The stationary separator wheel 352 of FIGURE 7 is replaced by a flanged separator disc 804 (FIGURE 23) having an approximately cylindrical annular flange or rim 806 supported by struts 807 from the outer casing portion 370 and serving the same function as the cylindrical rim of the separator wheel 352 in FIGURE 7. The central portion of the separator disc 804 carries a power output shaft bearing 808 coaxial with the compressor drive shaft 224 and rotatably supporting one end of the power output shaft 810. Also rotatably supporting the shaft 810 and spaced axially away from the shaft bearing 808 is a second shaft bearing 812 mounted on a spider 814 connected at its outer end to the radial wall 370 of the turbine casing 368. Mounted in the space between the bearings 808 and 812 and keyed or otherwise drivingly connected to the power output shaft 810 is a multi-channel radial flow turbine rotor, generally designated 818, with radial blades 820 subdivided into three channels 822, 824 and 826 by partition walls 828 and 830 and an upper wall 832 (FIGURE 23). The blades 820 are radial (FIGURE 24) and at their upper ends the blade channels 824 and 826 are adapted to be selectively masked or valved by a cylindrical valve sleeve 834 slidably and rotatably mounted on a cylindrical support 836 which carries circumferentially-spaced upstanding pins 838 (FIGURE 25). The pins 838 engage oblique cam slots 840 formed in the valve sleeve 834, which carries an upstanding lug 842 supporting a pivot pin 844 to which one end of a control rod 846 is pivotally connected.

Extending from the outlets 848 of the turbine casing 368 axially and then radially toward the valve sleeve 834 is an angle or elbow casing wall 850 (FIGURE 23) forming with the corresponding annular elbow portion 852 of the separator wall 804 an annular passageway 854 leading radially inward to the outer ends of the blade channels 822, 824 and 826 of the turbine rotor 818. Additional regulation and guidance of the combustion gas direction from the inner portion of the passageway 854 to the outer ends of the rotor blade channels 822, 824 and 826 is provided by multiple guide vanes 856 mounted on pivot rods 858 journaled in the elbow portion 852 and elbow casing wall 850 respectively (FIGURE 23) and carrying crank arms 860 on their outer or rearward ends. Pivotally connected to the outer ends of the crank arms 860 (FIGURE 24) are the inner ends of links 862, the outer ends of which are pivotally connected to a ring 864 arcuately shiftable in an annularly grooved boss 866 on the elbow casing wall 850. Projecting radially outward from the ring 864 is an integral arm 868 (FIGURE 24) carrying a pivot pin 870 to which a control rod 872 is pivotally connected.

The operation of the engine 800 of FIGURES 23 to 25 inclusive is substantially identical with that of the engine 200 of FIGURES 7 to 13 inclusive, down to and including that of the compressor driving turbine 342. The combustion gases after passing through the blades 344 of the compressor driving rotor 342 and through the passageway between the separator disc flange 806 and the channel portion 340 of the shroud segments 304 proceed through the annular passageway 854 past the guide vanes 856 into the multiple blade channels 822, 824 and 826, it being assumed that the sleeve 834 has been rotated clockwise in FIGURE 24 by the control rod 846 to uncover the outer ends of the blade channels 824 and 826. The combustion gases thus directed by the guide vanes 856 enter the blade channels 822, 824 and 826 of the turbine rotor 818, imparting rotation to the latter and to its output shaft 810. Control of the power imparted to the output turbine rotor 818 is maintained by rotating the sleeve 834 (FIGURE 24) by the control rod 846 counterclockwise so as to cause it to move over and valve the outer or inlet end of the blade channels 826 and 824. This valving is shown at its maximum extent in FIGURES 23 and 25, the blade channel 822 being continuously unimpeded by the sleeve 834.

*Gas Turbine Engine With Direct Drive for Constant Speed Machine*

The gas turbine engine, generally designated 900, of FIGURE 26 is substantially identical in construction with the engine 30 of FIGURES 1 to 6 inclusive back to the compressor drive vane turbine rotor 154. Beyond this location, the compressor driving shaft or main shaft 46 is continued rearwardly in a power output extension shaft portion 902 so that the single turbine 154 drives both the compressor rotor 82 (FIGURE 1) and the machine, such as an electrical current generator, connected to the output shaft portion 902. The simplified engine 900 can be operated at substantially constant speeds but at variable power loadings since its two-piece rotor can be adjusted to vary its mass flow of air. It is preferable to operate the engine 900 at a substantially constant speed where a high compression ratio can be maintained with a consequently high efficiency, such as in driving an electrical current generator, ventilation fan or other machine so operated.

The operation of the simplified gas turbine engine 900 of FIGURE 26 follows that of the engine 30 of FIGURE 1 with the exception of the fact, as stated above, that the turbine rotor 154 performs the dual function of driving the compressor through the shaft 46 and driving the driven machine, such as an electrical current generator, through the shaft portion 902 rather than providing an additional turbine rotor for that purpose. Accordingly, no additional description of the operation is believed necessary.

*Interchangeable Features of Foregoing Gas Turbine Engines*

It is believed to be self-evident that the forms of the invention shown in FIGURES 1 and 7 are not limited to any particular type or shape of compressor blades, and that either the radial blades 276 shown in FIGURE 8 or the arcuate blades 132 shown in FIGURE 2 may be used, or any other suitable form of blade, with or without the diffuser 264, 266 of FIGURE 7 or 744, 770 of FIGURE 22. It will also be evident that the invention is not limited to any particular form of sealing or leakage-reducing device between the compressor rotor and the casing, such as that shown at 144, 146 in FIGURES 1 and 14, at 286 in FIGURE 7, or at 726, 728, 772 in FIGURE 22, as any suitable sealing or leakage retarding device may be used. It will further be evident that the leakage-retarding adjustment-permitting arrangements shown at 130, 132 in FIGURE 3 and at 276, 278 in FIGURE 9 between the axially relatively slidable rotor halves are also interchangeable. It will finally be evident that at some loss in efficiency, blades in the rotors may be dispensed with altogether, the air being compressed and expelled by the frictional drag upon the air molecules by the walls of the rotating compressor rotors and by the effect of centrifugal force upon the air molecules. The frictional drag on the air molecules imparts to them a circumferential component of motion and their weight simultaneously imparts to them a radial component of motion from the action of centrifugal force upon them, with the resultant path upon the molecule a spiral of constantly increasing radius around the axis of rotation as an axis. This is particularly true in embodiments of the invention having two or more separate air channels, such as the embodiments shown in FIGURES 15, 17 and 18, where each channel is relatively narrow.

Furthermore, it will be evident that the invention is not to be restricted to the simple governing means shown in FIGURE 14 for controlling the separation of the rotor halves in accordance with the speed thereof, it being understood that any conventional type of governor utilizing flyballs controlling hydraulic valving to position the movable rotor half 80 relatively to the stationary half 84 may be used, such as is used, for example, in a conventional constant-speed propeller.

It will also be evident that this invention is also not restricted to the particular turbine blade designs and arrangements shown in FIGURES 6 and 11 and that other designs and arrangements, including additional stages, that is, several wheels in series, may optionally be used to obtain the characteristics needed in conjunction with the compressor invention disclosed.

It will finally be evident that in place of the combustors located within the so-called combustion chambers, such as the combustors 120 within the combustion chamber 44 (FIGURE 1), the air passing through these chambers may be heated by heat exchange from a conventional external firing arrangement, especially where the engine is to be used in a stationary or marine gas turbine engine installation where weight is of less importance than in a vehicle installation. Such externally-fired heat exchanging arrangements are shown, for example, in the book "Gas Turbines" by H. A. Sorensen, first edition 1951, published by the Ronald Press Co., New York, N.Y. Figure 5-4 thereof on page 151 shows a comparison of closed and open systems, namely internal and external firing. Figure 5-12 on page 158 and Figure 5-13 on page 160 show an air heater or gas heater for coal firing used in stationary gas turbine engines. Figure 5-14 on page 161 thereof shows on oil-fired air heater for the same purpose. Such conventional externally-fired arrangements somewhat roughly resemble the conventional Scotch boiler and such installations, as stated in the Sorensen book, have been manufactured by the Escher-Wyss Engineering Works in Switzerland.

What I claim is:

1. A variable flow compressor comprising a hollow housing structure containing a compressor chamber and an outlet chamber disposed outwardly of and in communication with said compressor chamber, a compressor driving shaft rotatably mounted in said housing structure, a centrifugal type air compressor rotor in said compressor chamber connected in driven relationship to said shaft and having an air passageway therethrough communicating with said outlet chamber, said rotor including a pair of rotor halves drivingly connected to one another for simultaneous rotation and having vanes extending toward one another in overlapping relationship with said air passageway disposed therebetween, mechanism for moving one rotor half axially relatively to the other rotor half for varying the cross-sectional area of the air passageway therebetween whereby to vary the mass flow rate of the gas passing through said rotor air passageway, and gas leakage prevention means comprising a non-rotatory cover wall connected to said movable rotor half for axial travel therewith and a flexible annular bellows structure connected at one end to said housing structure and at its other end to the non-rotatory rotor cover wall.

2. A variable flow compressor, according to claim 1, wherein said cover wall has a hollow central hub and said movable rotor half also has an axially-extending hub mounted for relative rotation within said cover wall hub.

3. A variable flow compressor, according to claim 1, wherein said cover wall has an approximately radial peripheral portion extending outwardly therefrom beyond said movable rotor half, and wherein said bellows structure is connected to said peripheral portion.

References Cited in the file of this patent
UNITED STATES PATENTS

| | | |
|---|---|---|
| 890,355 | Goeriz | June 9, 1908 |
| 896,585 | Salzer | Aug. 18, 1908 |
| 1,433,995 | Fowle | Oct. 31, 1922 |
| 1,689,667 | Free | Oct. 30, 1928 |
| 1,889,816 | White | Dec. 6, 1932 |
| 2,233,983 | Kice | Mar. 4, 1941 |
| 2,280,835 | Lysholm | Apr. 28, 1942 |
| 2,316,608 | McMahan | Apr. 13, 1943 |
| 2,358,744 | Stepanoff | Sept. 19, 1944 |
| 2,373,166 | Chapman et al. | Apr. 10, 1945 |
| 2,435,836 | Johnson | Feb. 10, 1948 |
| 2,613,500 | Lysholm | Oct. 14, 1952 |
| 2,646,210 | Kohlmann et al. | July 21, 1953 |
| 2,672,726 | Wolf et al. | Mar. 23, 1954 |
| 2,715,814 | Barr | Aug. 23, 1955 |
| 2,771,239 | Moreillon | Nov. 20, 1956 |
| 2,821,414 | Jensen | Jan. 28, 1958 |
| 2,854,210 | Bachle | Sept. 30, 1958 |
| 2,861,774 | Buchi | Nov. 25, 1958 |
| 2,927,536 | Rhoades | Mar. 8, 1960 |

FOREIGN PATENTS

| | | |
|---|---|---|
| 460,770 | Canada | Nov. 1, 1949 |
| 500,808 | France | Jan. 7, 1920 |
| 668,607 | Germany | Dec. 7, 1938 |
| 838,870 | France | Mar. 17, 1939 |
| 1,093,003 | France | Nov. 17, 1954 |